United States Patent

[11] 3,593,583

[72] Inventors Howard H. Anderson, Covina;
Rudolph H. Moyer, West Covina;
Donald J. Sibbett, Cucamonga;
David C. Sutherland, El Monte, all of Calif.
[21] Appl. No. 32,918
[22] Filed Apr. 29, 1970
[45] Patented July 20, 1971
[73] Assignee Geomet, Incorporated
Rockville, Md.

[54] MERCURY AIR SAMPLER FOR GEOLOGICAL STUDIES
7 Claims, 6 Drawing Figs.
[52] U.S. Cl. ................................................... 73/421.5 R
[51] Int. Cl. ............................................................. G01n 1/22
[50] Field of Search ............................................. 73/421.5, 422, 23; 55/387

[56] References Cited
UNITED STATES PATENTS
2,263,335 11/1941 Hemz ........................... 73/23
3,068,402 12/1962 Redhead ........................ 73/23 X
3,507,622 4/1970 Tammelin et al. ............. 73/23 X OTHER REFERENCES
Publication: ANALYTICAL CHEMISTRY, Abstract QD1A51 Co. #65 2 pg. 1373 1966. "Argon Detector for Determination of Mercury Gases," (Copy in 73/421 5) by Krestornikov et al.

Primary Examiner — Louis R. Prince
Assistant Examiner — Daniel M. Yasich
Attorney — David H. Semmes ABSTRACT: Apparatus and system for detecting and sampling mercury vapor in the atmosphere especially adapted for geological surveying or studies utilizing sensitized absorption of the vapor on surfaces of noble metal wire grids. The wire grids operate to concentrate encountered low levels of vapors. Release of mercury from the grid into a photometer for quantitation is achieved by direct passage of electrical current through the grid wire. The grids are designed to allow for ohmic heating of the absorbent wire to render possible a portable monitoring device. The apparatus is operable from vehicle batteries or the like or from alternator power INVENTORS
DONALD J. SIBBETT
RUDOLPH H. MOYER
DAVID C. SUTHERLAND
HOWARD H. ANDERSON BY David H. Semmes
ATTORNEY

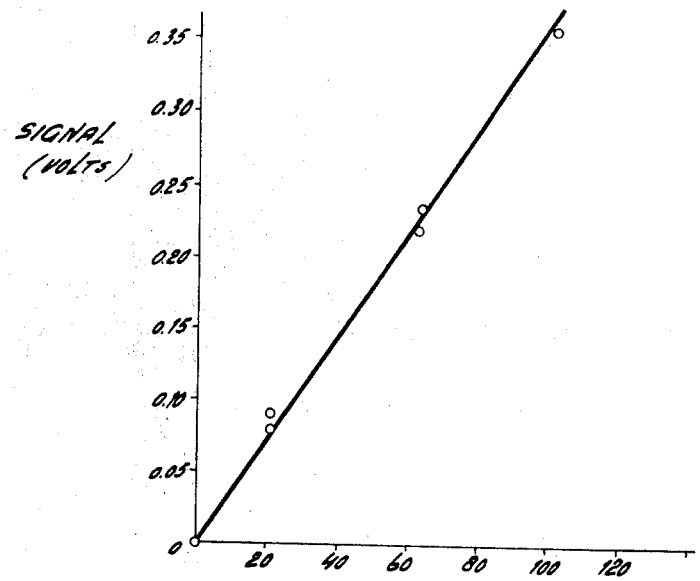
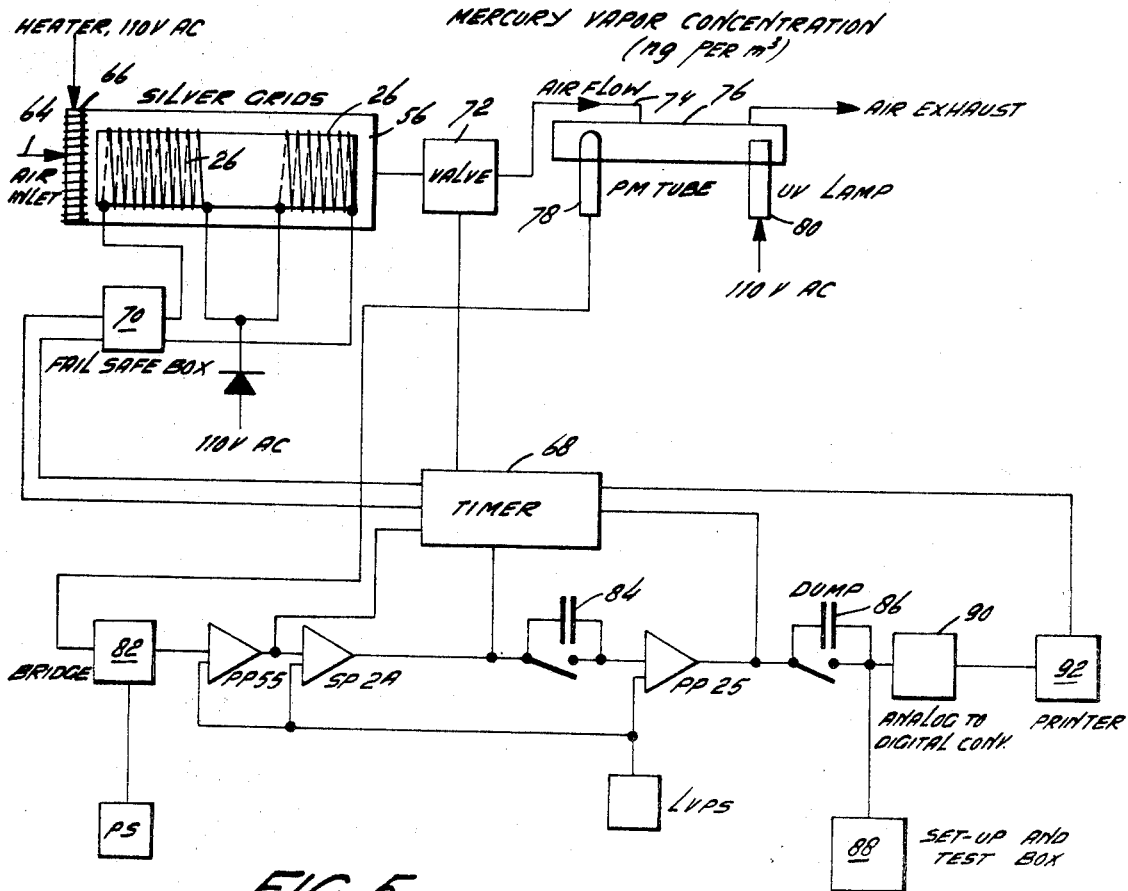
FIG. 6
FIG. 5

MERCURY AIR SAMPLER FOR GEOLOGICAL STUDIES

BACKGROUND OF THE INVENTION

Instrumentation for quantitating the amount of mercury found in the air particularly useful in conducting geological explorations and studies having high sensitivity or the ability to measure very small mass concentrations in the order of for example 1.0 nanogram per cubic meter of air, the approximate background level, have been devised. Measurement of mercury in the air and soil as an indicator during exploration for many base, and precious, metal ore deposits has been an accepted technique for a considerable period. In general, all gas-measuring instruments heretofore known have utilized procedures including: absorption of the mercury from the air sampled onto the surface of a noble metal wettable by mercury; desorption as vapor by heating the collected mercury; and estimation of the mercury vapor by measurement of its optical absorption at the wavelength of a mercury resonance line (253.7 nm., usually) in an ultraviolet photometer.

Known devices have been difficulty portable. Normally they required that samples of mercury collected from the air, the soil or soil-air be transported to a central analytical station for determination of the indicator vapor. Such procedure is time consuming and inefficient with respect to conducting geological surveys. Additionally, in order to utilize a random of the absorbent material, usually gold or silver foil or wool, desorption was carried out with the assistance of an induction furnace which is expensive, bulky, heavy and requiring relatively high power inputs.

A wholly satisfactory solution for geological applications resolving problems associated with mercury vapor measuring have not been available.

SUMMARY OF THE INVENTION

The present invention is directed to apparatus and system for mercury air sampling and measurement especially adapted for geological surveying, studies and the like realizing an easily portable system which can operate from storage batteries such as automobile or truck types or alternator power readily available and transportable to areas where testing is to be conducted. One useful embodiment of such a mercury sampling device consists of two grids of silver wire mounted at opposite ends of a rotor adapted for revolving at high speeds, such as for example 1,500 r.p.m. The silver wire of the grids is supported on an insulated frame so that the wire and frame conjointly can be easily removed from the rotor, transferred to a sealable airtight compartment and heated by direct passage of electrical power through the grid to desorb the amalgamated mercury. The mercury vapor resulting, as released from the surface of the silver wire upon heating, is carried by an airstream into a cell for determination of mercury content by means of a photometer operating for example at a wavelength of 253.7 nm. Photometers specially designed for given airflow rates and geometry of sampler grids and related heating requirements are known in the art.

A number of collector grid configurations may be utilized including U-shaped bars, split-circles, or supported foil vanes. These collection surfaces may be mounted on the extremities of a rotor or with on-axis geometry.

The present invention utilizes a new technique including a consecutive heating method wherein two grids in the sampler are heated consecutively rather than simultaneously, as in the prior art, to obviate ejecting into the photometer all mercury vapor together with possible interferences such as might be obtained from absorbed hydrocarbons. The consecutive heating of the grids results in obtaining a first measure of signals caused by materials other than mercury while simultaneously concentrating the mercury from the first grid on the second grid. Subsequently, when the second grid is heated, the photometer signal which results is electronically decreased by the signal from the first grid. This procedure corrects the signal caused by mercury vapor for whatever interferences may be absorbed on the sampler. The resultant light absorption as measured by the photometer is, after appropriate calibration, directly related to the absolute amount of mercury vapor in the air and these results can be directly correlated with the geological information sought.

Additional objects and advantages of the present invention will be more readily apparent from the following detailed description of a preferred embodiment of apparatus for practicing the invention when taken together with the accompanying drawings in which:

FIG. 5 is a schematic of the electrical/electronics circuitry; and

FIG. 6 is a graph depicting photometer signals plotted against mercury vapor concentrations for obtained test data.

Figure 1:
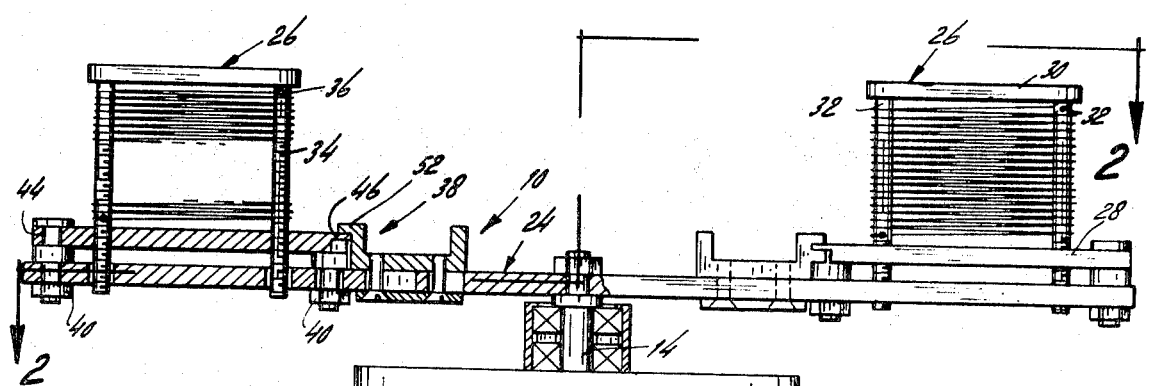
FIG. 1 is a schematic elevational view, partly in section, of a sample collector and drive unit.

Referring to the drawings in detail there is shown a preferred design for practicing the invention utilizing the inventive concepts as indicated above. It is to be understood that the depicted apparatus is illustrative of a single preferred design and that other apparatus specifics can be utilized in practicing the concepts of the invention.

In the form of the invention shown the entire device is of a nature and size adapted for ready portability to a test area and there operable for conducting the complete sampling and testing procedures required for geological surveying and the like. As designed, the apparatus requires only a 12-volt source of power for operation. Desired readout instrumentation, not specifically shown, can consist of information converters and printers and which can be at convenient on- or offsite locations.

The shown apparatus includes, generally designated, a sample collector unit 10 rotatably mounted by and on a motor housing and mounting structure 12 through a driven shaft 14 and bearing 16 in bearing housing 18, washer or collar 20 and securing nut 22. A two-arm rotor blade 24 is secured on the shaft for rotation by a drive motor operable by for example a 12-volt power supply such as a vehicle battery. On each rotor blade 24a, 24b, preferably aluminum, there is detachably mounted a collector grid assembly 26. The collector grid assembly includes, as a grid-mounting frame, a lower bar 28 and an upper bar 30 preferably of hard anodized aluminum which interconnect and are mounted on posts 32, preferably also of hard anodized aluminum for insulation and secured by any appropriate means. The posts 32 are threaded as at 34 with an appropriate pitch and around which is wound silver wire of for example 0.020 diameter size with the wire wound around every thread pitch and having the ends secured as at 36 by any appropriate means. The silver wire as mounted constitutes a collection grid for mercury in air being tested during the air-sampling operation and with the rotor operating.

Figure 2:
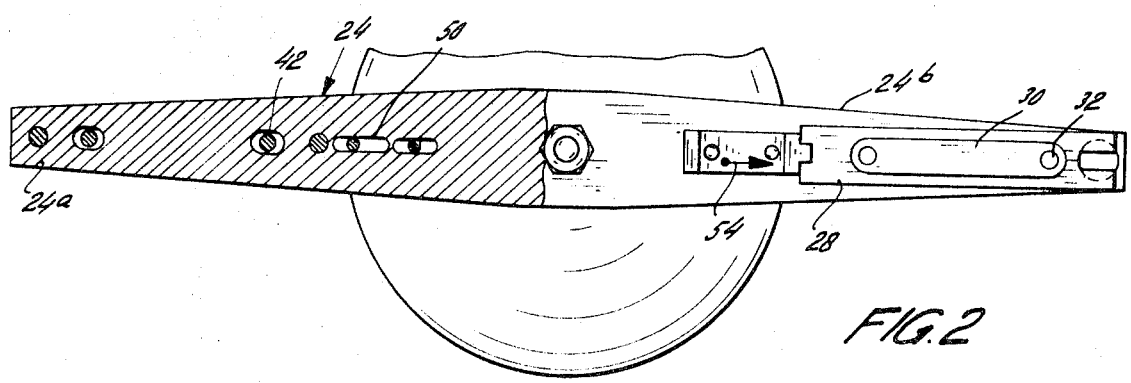
FIG. 2 is a plan view taken substantially on the line 2-2 of FIG. 1.
Figure 3:
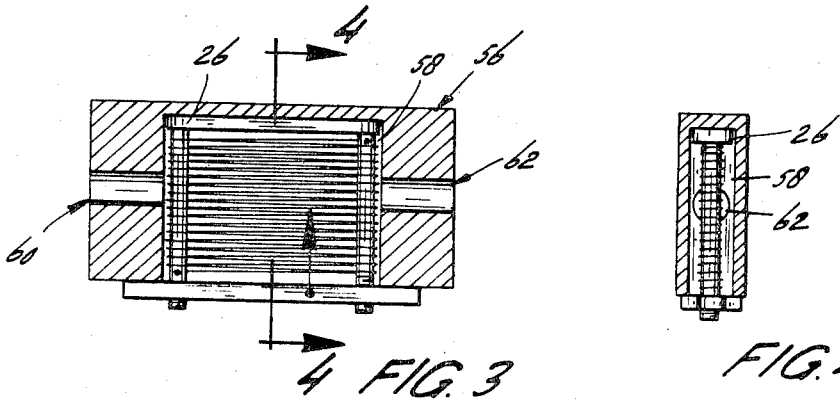
FIG. 3 is a sectional view through a vaporizing chamber, with a sampling grid inserted therein, for vaporizing mercury collected during a sampling step.
Figure 4:
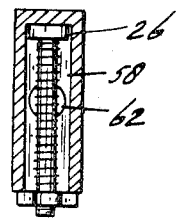
FIG. 4 is a sectional view taken on line 4-4 of FIG. 3.

Any desired mounting means for the collector grid assemblies can be used but as contemplated and shown the mounting means generally designated 38 are of a nature such that the collector grid assemblies can be easily and quickly mounted on or removed from the rotor. Such means can include for example studs 40 slidably mounted in slots 42 with the studs being adapted for supporting engagement with supporting surfaces and areas including openings 44, which can be slots if desired for easy assembly and lips 46 engageable on the studs or posts 40 as shown in FIG. 1. Fastening members 38 are slidably mounted in slots 50 in the rotor blades and are provided with lips or projections 52 in the nature of extending noses for coacting securement engagement with the lip portions 46 of lower bar 28. Securing movement of fastening members 38 is indicated in FIG. 2 by arrow 54.

Subsequent to the air-sampling operation the collector grid assemblies 26 are removed from the rotor and placed in a double vaporizing chamber 56, generally designated, preferably of aluminum, including a collector grid assembly cavity 58 into which air inlet duct 60 and air outlet duct 62 open.

When the two grids are placed in the vaporizing chamber, the silver wire grid is heated to approximately 400°—450° C. to desorb the amalgamated mercury extracted from the air. A schematic of the electronics for practicing the invention is shown in FIG. 5 of the drawings. With the grids placed in the vaporizing chamber 56, air is drawn thereinto through air inlet 60 as indicated by arrow 64 and heated by heater 66 to vaporize mercury. Any desired means can be utilized for forcing air through the vaporizer. A blower unit in the nature of a 110-volt AC brushless motor and blower can be used. The sample air passes over heater 66 thence through the vaporizer unit, passing over grids 26 selectively actuated from a 110-volt AC power source controllable by a timer 68 with the circuit including a fail-safe mechanism indicated by box 70. The timer 68 also controls a valve 72 for selected airflow control. The air then flows as indicated by arrow 74 into an absorption chamber 76 which constitutes, in part, a photometric testing device of a known type. Operatively associated are a photometer tube 78 and an ultraviolet lamp 80. The photometer, specially designed for the desired airflow rates and geometry of the sampler grids and related heating requirements, utilizes a well-known technique. For example, a dual-beam type of photometer is described by Samuel H. Williston in "Journal of Geophysical Research," Volume 73, Number 22, Nov. 15, 1968, pages 7051—7055 and a single-beam device has been taught by W. W. Vaughn et al. in "Geological Survey Research," 1964, U. S. Geological Survey, Prof. Paper 501-D, pages D123—D127 and "U. S. Geological Survey Circular 540," U. S. Department of Interior, 1967. Obviously different photometers can be utilized within the teachings of the invention and are well known to those skilled in the art. Additional details are not considered necessary herein. The circuit operationally includes a bridge 82 from power source PS with operational amplifiers PP 55, SP 2A, PP 25, valves 84, 86 and power source LVPS. A setup and test apparatus is indicated by box 88 with an analog to digital converter schematically indicated at 90 and a printer 92.

Operation of the device is as follows:

Air, passed over the collecting grid surfaces as a consequence of the rotational movement of the rotor, may be sampled at rates controlled by the electrical input of the motor. Rotational rates from 200 to 1,200 r.p.m. have been preferred. For smaller rotors or other rotor configurations, higher rotational velocities may be utilized. During the processing cycle, the first grid winding is heated, desorbing the mercury and contaminants. These vapors flow across the second grid where the mercury vapors, being much more strongly absorbed than the other vapor components, reabsorb. The contaminants from the first grid are then measured in the photometer. This gives an electronic signal value $V_1$. $V_1$ is the integrated area under the voltage-time curve obtained from the photometer when the first grid is heated. After 20 seconds (adjustable), the second grid is heated. The optical absorption of these vapors in the photometer gives a value $V_2$. $V_2$ is the signal obtained from all the mercury vapor plus those obtained from materials other than mercury. The measure of the signals caused by materials other than mercury is first obtained while simultaneously concentrating the mercury from the first grid on the second one. Then when the second grid is heated the photometer signal which results is electronically decreased by the signal from the first grid. This procedure corrects the signal caused by mercury vapor for whatever interferences may be absorbed on the sampler. The resultant light absorption as measured by the photometer is, after appropriate calibration, directly related to the absolute amount of mercury vapor found in the air. $V_2$ is the integrated area under the voltage-time curve obtained from the photometer when the second grid is heated. The difference $V_2$ minus $V_1$ equals $V_S$ and is read as the system output. $V_S$ is the difference between the two integrated voltage-time outputs. The signal difference $V_S$ is directly proportional to the mercury concentration in the cell and can be read by a number of techniques depending upon the data handling technique which is selectable. The difference $V_S$ can be digitally indicated as shown.

In FIG. 6 the results of test data for the device indicates photometer signals (volts) plotted against mercury vapor concentrations (n.g. per m.$^3$). Actual data points are indicated and clearly, the response of the device is linear over the range normally encountered in areas exhibiting geological anomalies.

While a preferred embodiment of apparatus has been shown and described, and the principles of operation described with reference thereto, manifestly changes in minor details of construction and operation can be incorporated within the teachings of the invention as defined in and limited solely by the appended claims.

We claim:

1. In a system for sampling and measuring mercy content in air for geological studies:
   A. means to sample quantities of air and collect mercury in vapor form contained therein by absorption of said mercury on a noble metal wire grid collector comprising:
      i. a horizontally mounted double-arm rotor;
      ii. means to drive said rotor;
      iii. said grid collector being a silver wire grid wound in convolute form, so as to be adapted for sensitized absorption of mercury on the surfaces of the wire, said silver wire grid being vertically mounted on each arm of said rotor and adapted on rotation of said rotor to collect mercury vapor from the atmosphere;
   B. means to desorb collected mercury from the collector by ohmic heating of the grid; and
   C. means to quantitatively measure the mercury content released from the grid.

2. A system as claimed in claim 1, said grid comprising spaced posts, upper and lower bars interconnecting said posts, said posts being threaded, said wire being wound in said threads to form the grid, and said rotor including means vertically mounting said grid for orbital movement through the atmosphere.

3. A system as claimed in claim 2 including said rotor arm mounting said grid, and means detachably interconnecting said grid and rotor for attachment and detachment of the grid.

4. A system as claimed in claim 3 including a sealable airtight compartment separate and remote from said rotor, said grid upon removal from said rotor being insertable in said compartment, the desorption means constituting heating means for said grid by direct passage of electric power therethrough.

5. A system as claimed in claim 4 and including two separate grids detachably mounted on the rotor, both said grids being insertable in said compartment and said heating being consecutively instituted with respect to the two grids whereby a measure of signals caused by materials other than mercury is first obtained, while desorbing mercury from the first grid, then obtaining a measure of mercury content by reabsorbing said mercury on the second grid, then heating of the second grid to desorb mercury quantity actually being measured by correlation with the said measure of signals caused by materials other than mercury to determine the absolute amount of mercury vapor in the air.

6. Method for sampling and measuring mercury content in air for geological studies comprising:
   A. sampling quantities of air and collecting mercury in vapor form contained therein by absorption on a wire grid collector comprised of noble metal wire;
   B. resistance heating the grid to desorb collected mercury therefrom and in a manner to separate mercury from background contaminants or interferences in said air; and
   C. quantitatively measuring the desorbed mercury content released from the grid.

7. A method as claimed in claim 6 and including two collecting grids mounted for orbital collecting movement through the air, heating the two grid collectors consecutively for elimination of signals from background contaminants or interferences.